April 28, 1931. H. A. WADMAN 1,802,991
DUPLEX TEMPERATURE REGULATOR FOR LEERS AND THE LIKE AND METHOD
Filed June 5, 1929
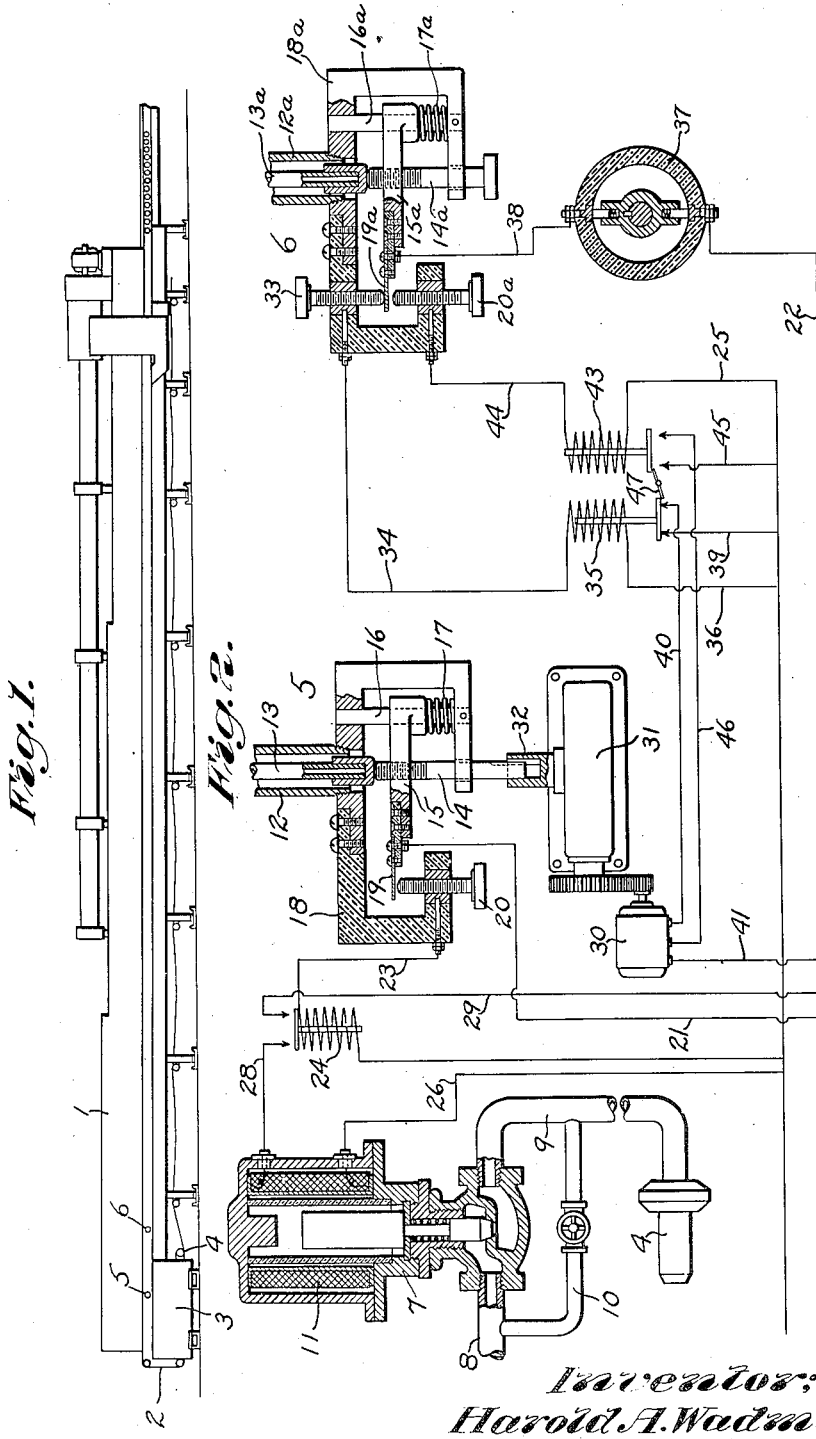

Patented Apr. 28, 1931

1,802,991

UNITED STATES PATENT OFFICE

HAROLD A. WADMAN, OF HARTFORD, CONNECTICUT, ASSIGNOR TO HARTFORD-EMPIRE COMPANY, OF HARTFORD, CONNECTICUT, A CORPORATION OF DELAWARE

DUPLEX TEMPERATURE REGULATOR FOR LEERS AND THE LIKE AND METHOD

Application filed June 5, 1929. Serial No. 368,531.

My invention relates to temperature regulators and has particular relation to temperature regulators for heat treating apparatus, such as leers, forehearths, and the like, wherein it is, or may be, desired to regulate the temperature at one point in the apparatus to heat a continuously moving mass of material to a certain desired temperature at another point.

In the heating of various continuously moving masses of material, it has been proposed to control or regulate the temperature at a given point in the heating apparatus by means of a thermostat or the like, located close to the source of heat, which thermostat controls mechanism for supplying more or less heating medium to the heat producing means. For example, in the heating and annealing of glassware in a tunnel leer, it has been proposed to attempt to regulate the temperature at a given point in the tunnel by means of a thermostat located close to the fire box. However, difficulties sometimes are experienced in regulating the temperature in a tunnel in this manner at a point removed from the fire box, because of the fact that the temperature and mass of the glassware delivered to the leer, the speed at which the ware is conducted through the leer, and the ability of the ware to absorb and radiate heat, vary, or are apt to vary, between very wide limits. Consequently, when the thermostat is located at or near the source of heat, too little or too much heat will be produced to give the desired temperature at a given critical point removed from the said source of heat. On the other hand, if the thermostat is located at the said critical point in the tunnel, the elapse of time necessary for increases and decreases in temperature at the heat source to become effective at the critical point, and the above-mentioned variations in the character in and rate of travel of the ware, cause extreme and undesirable fluctuations in temperatures not only at the source of heat, but also at the critical point where it is most desired to control the temperature.

Therefore, it is the general object of my invention to provide novel apparatus for heating continuously moving material whereby the temperature at a critical point in the apparatus removed from the source of heat therein may be automatically maintained at the desired point irrespective of variations in the character of the material being heated, and the rate of travel of the said material through the apparatus.

Another object of my invention is to provide novel heating apparatus for heating continuously moving material of varying character to the desired temperature at a critical point removed from the source of heat, which apparatus includes temperature responsive means located close to the source of heat for controlling the production of heat, the said means being automatically adjusted from time to time according to changes in temperature which may take place at or near the said critical point.

It also is an object of my invention to provide novel heating apparatus wherein the heating of the apparatus near the heat source is automatically controlled by regulating the supply of heating medium to the said source, such control being automatically corrected or varied to maintain the desired temperature at a critical point removed from the said heat source.

A further object of my invention is to provide a novel construction of means for regulating the temperature in heating apparatus at a critical point removed from the source of heat, characterized by the provision of a plurality of temperature responsive devices, one of which controls the supply of heating medium to the heating means in accordance with the temperature in the apparatus at or near the heat source, and another of which varies the setting of the first device in response to changes in temperature at or near the said critical point, to maintain the desired temperature conditions at said point irrespective of the influence of factors tending to change the temperature from the value desired.

Other objects and advantages of the invention from a practical standpoint will be pointed out in the detailed description thereof which follows, or will become apparent from such description.

In order that the invention may be readily understood and its manifold practical advantages appreciated, reference should be had to the accompanying drawing in which I have illustrated one embodiment thereof. I have illustrated my invention as being incorporated in a tunnel leer including a fire box which is heated by means of a gas burner. The supply of gas to the said burner is controlled by means of an electrically operated valve, which in turn, is controlled through electric circuits by a thermostat located close to the fire box and disposed within the floor of the tunnel. The setting of the first thermostat is varied and controlled through suitable electric circuits by means of a second thermostat located preferably at the critical point at which it is desired to maintain a certain temperature, for example, at that point in the tunnel where the desired annealing temperature is to be maintained. Thus, if the first thermostat operates in such a manner as to cause the generation of too little or too much heat, resulting in corresponding variations from the desired temperature at the critical point, the second thermostat will adjust the setting of the first thermostat accordingly, and the temperature of the glassware will be maintained at the desired value at or near said point, regardless of variations in the character and rate of travel thereof.

It is to be understood that my invention is susceptible of embodiment in other forms of apparatus than that shown in the drawing, and changes may be made in the details of construction without departing from the said invention as defined in the appended claims.

In the said drawings:

Figure 1 is a diagrammatic view in side elevation of a tunnel leer embodying my invention by which my novel method may be practiced, and showing approximately the relative location of two temperature responsive devices therein; and Fig. 2 is a diagrammatic view showing the electrical connections between the electrically operated fuel control valve and the thermostats embodied in the construction shown in Fig. 1, the said valve being shown in longitudinal section and the said thermostats and related mechanism being shown partly in horizontal section and partly in plan.

Referring to the drawings:

The numeral 1 designates a tunnel leer of known construction, such as that shown in Patent No. 1,560,481, granted November 3, 1925, to Vergil Mulholland. The said leer comprises a conveyor belt 2 which is drawn through the tunnel by suitable driving mechanism, not shown, a fire box 3 located beneath the receiving end portion of the said leer, and a gas burner 4 for producing heat in the said fire box to supply heat to the tunnel. It will be understood that electric heating elements may be employed for heating the tunnel of the leer instead of the fire box and burner, if desired. Located above the said fire box and preferably extending transversely through the floor of the tunnel is a temperature responsive element 5, a second similar temperature responsive element or thermostat 6, being positioned in the floor of the tunnel at a point to the rear of the location of the thermostat 5. For the sake of illustration, it may be assumed that the critical point at which the thermostat 6 is located, is that point in the tunnel where it is desired to maintain the desired annealing temperature.

The supply of gas or other fuel to the burner 4 is controlled by means of an electro-magnetically operated valve of known construction indicated generally at 7, the inlet port of the said valve being connected to the source of gas by a conduit 8 and the outlet port of the said valve being connected to the burner 4 by conduit 9. In order to supply a minimum amount of gas to the burner to maintain the latter in continuous operation, even though the passageway through the valve 7 may be closed, a valve controlled by-pass 10 is interposed between conduits 8 and 9, as shown.

The opening and closing of the valve 7, resulting from the energization and the deenergization of the solenoid 11 thereof, is controlled through suitable electric circuits, to be hereinafter described, by means of the thermostat 5. This thermostat which, as above stated, is located above the fire box 3 in the floor of the tunnel, may be of known construction. It may comprise an outer metal tube 12 consisting of nickel or iron-chrome-nickel alloy and an inner tube 13 consisting of fused silica. Such a thermostat is shown in greater detail in the pending application of Vergil Mulholland and William T. Honiss, Serial No. 199,823, filed June 18, 1927. The outer adjoining ends (not shown) of these tubes are connected in known manner, as a result of which an increase in temperature causes the tube 12 to expand and to raise the lower end of the tube 13, (looking at Fig. 2), while a decrease in temperature causes contraction of the tube 12 and corresponding downward movement of tube 13, the expansion and contraction of the latter being practically negligible. The lower end of the tube 13 abuts the upper end of a rod 14, screw threadedly mounted in an arm 15, one end of which is slidably mounted on a guide 16, the said arm being urged upwardly by a spring 17 surrounding the said guide and interposed between the under side of the end of the said arm and an inwardly extending arm of the stationary bracket 18. The inner end of the tube 12 is rigidly connected, as by screw threads as shown, to the stationary bracket 18 which carries rod 14, arm 15, guide 16, and spring 17 in assembled relation. Mounted on and insulated from the other end of the said arm 15 is a contact 19 disposed above, and adapted to engage, an upwardly extending contact screw 20, mounted in an arm of bracket 18, the said contact 19 being connected by means of conductor 21 to the negative side 22 of an electric current supply line. The contact screw 20 is connected by a conductor 23 through the solenoid of a relay switch 24 to the positive side 25 of the said supply line. The relay switch 24 controls the flow of current from the positive wire 25 to wire 26, thence through the solenoid 11 of the valve 7, conductor 28, through the relay switch 24, and through conductor 29 to the negative wire 22 of the said supply line.

It now will be seen that when the tube 12 of the thermostat 5 contracts as a result of a drop in temperature below a desired predetermined value in the forward end portion of the tunnel above the fire box, contact 19 will be moved into engagement with contact 20, thereby causing energization of the solenoid to close the relay switch 24, the closing of the circuit through the solenoid 11 of the valve 7 and an increase in the supply of fuel to the gas burner. On the other hand, if the temperature in the forward end portion of the tunnel above the fire box increases above a predetermined value, the tube 12 of the thermostat will expand, opening the circuit through contacts 19 and 20 and thereby that through conductors 28 and 29, causing deenergization of the solenoid 11 of the valve 7, the closing of the said valve, and the diminishing of the supply of fuel to the burner 4.

It will be observed that by rotating the rod 14 in one direction or the other with respect to the arm 15, the contact 19 will be moved by the latter toward or away from the contact 20 as a result of which the circuit to the valve solenoid 11 will be closed and opened, and the supply of fuel to the burner increased or diminished at different temperatures in the tunnel above the fire box 3. While for a given setting of the arm 15 and contact 19, the temperature at the critical point in the tunnel may be controlled so long as the character of the material being heated remains unchanged, and the said material is conducted through the tunnel at a uniform speed, the thermostat 5 is inadequate to control the temperature at the said critical point, if the character of the material and the rate of travel thereof in the tunnel vary, for the reasons stated above. I therefore provide a thermostat 6 at the said critical point, which controls the flow of electric current through suitable electric circuits which, in turn, control the energizing and direction of rotation of a reversible electric motor 30. This motor drives reduction gearing, including a worm and a worm gear inclosed within the housing 31, the hub 32 of the said worm gear having a slidable keyed connection with the rod 14, so that rotation of motor 30 in one direction or the other causes corresponding adjustments of contact 19 toward or away from contact 20 which varies the operating effect of the thermostat 5.

The construction of the thermostat 6 and the arrangement of the electric circuit interposed between the latter and the motor 30 are as follows. The parts numbered 12a to 20a inclusive of the thermostat 6 and related mechanism are identical with the parts numbered 12 to 20 of the thermostat 5 and related mechanism. However, the switch controlled by thermostat 6 differs from that controlled by thermostat 5 in that rod 14a is adjusted manually and a contact screw 33 is provided in the upper portion of bracket 18a, the end of which screw is located above the contact 19a. The said contact screw 33 is connected through a conductor 34 to one side of the solenoid of the relay switch 35, the other side of which solenoid is connected through conductor 36 to the positive wire 25 of the electric current supply line. When the contact 19a is moved into engagement with contact 33 by the expansion of the tube 12a, resulting from an increase of the temperature at the critical point in the tunnel above the value predetermined by manually adjusting the rod 14a, the circuit through the solenoid of the relay switch 35 is closed intermittently in timed intervals by the timer switch 37, one side of which is connected to contact 19a by the wire 38 and the other side of which is connected to the negative wire 22 of the supply line, as shown. This intermittent energizing of the relay switch causes the latter to be opened and closed, and in turn to control the flow of current from positive wire 25 through a conductor 39, through the said switch, thence through a conductor 40 to and through one set of windings of motor 30, and thence through a wire 41 to the negative wire 22 of the supply line, thereby causing intermittent operation of motor 30 and adjustment in increments of contact 19 away from contact 20. As a result of this operation, the supply of fuel to burner 4 will gradually be reduced, the time intervals between adjustments as determined by the speed of rotation of timer switch 37, being of sufficient duration to permit the lowering of the temperature at or near the burner to become effective at the critical point where the thermostat 6 is located. Generally, the said switch will be rotated at a speed of, say, one revolution every two or three minutes, such rate being sufficient to prevent overrunning of motor 30 and overadjustment of the contact 19.

If, on the other hand, the tube 12a of thermostat 6 contracts as a result in a drop in the temperature at the critical point below the predetermined value, intermittent adjustments of contact 19 toward contact 20 will be effected in a manner similar to the above described operation, by intermittent reversed operation of the motor 30; that is to say, contact 19a will be moved into engagement with contact 20a, thereby permitting current to flow intermittently from positive wire 25 to and through the solenoid of a relay switch 43, thence through a conductor 44, contacts 20a, 19a, conductor 38, and through the timer switch 37 to the negative wire 22 of the supply line. The resulting intermittent opening and closing of relay switch 43 in turn controls the flow of current from positive wire 25 through a conductor 45, thence through the said switch, conductor 46, through another set of windings in the motor 30, and from the latter through wire 41 to the negative wire 22 of the supply line, thereby causing the motor to effect small adjustments of contact 19 toward the contact 20 to increase the supply of fuel to the burner 4. It will be obvious from the foregoing, that the intervals of time during which the timer switch 37 and the relay switch 43 are opened will permit increases in temperature in the tunnel near the burner to become effective at the critical point at which thermostat 6 is located, and which is assumed to be the point at which the desired annealing temperature is to be maintained.

As a matter of precaution, a lever 47 pivoted at its center, is interposed between and in engagement with the bottom of the blade's relay switches 35 and 43 to insure that when one of them is closed, the other will be held open thereby. However, this lever 47 is merely a safety device, and may be omitted if desired.

It is thought that the method of employing my novel duplex temperature regulator in a tunnel leer for annealing glassware will be obvious from the foregoing description thereof. Thus, if the temperature, mass, and rate of travel of the glassware delivered to the leer vary, and if the burner operates in such manner, as to cause the temperature in the tunnel above the fire box to rise or fall below the predetermined desired value, thermostat 5 will operate to restore the temperature to said value. However, variations in the temperature of the glassware during its passage from a position above the firebox to the critical point, resulting from absorption and radiation of heat and from other causes, cause the temperature at the critical point to vary above or below the desired predetermined value, whereupon the said thermostat 6 operates to adjust in increments the setting of the thermostat 5, to restore the temperature to and maintain it at the desired predetermined value. It will be understood that the initial adjustment of thermostat 5 will be such as to prevent too high a temperature to be reached in the tunnel above the fire box. Nevertheless, the operation of the thermostat 5 may be adjusted automatically between sufficiently wide limits to give the desired results at the critical point in the tunnel.

Having thus described my invention, what I desire to claim and secure by Letters Patent is:

1. Apparatus for controlling the temperature in a tunnel-type glass annealing leer, comprising temperature responsive means for controlling the supply of heat to the tunnel, a second temperature responsive means for varying the setting of the first named temperature responsive means, and means for causing intermittent operation of the last named means.

2. Apparatus for controlling the temperature in a tunnel-type glass annealing leer, comprising temperature responsive means for controlling the supply of heat to the tunnel, means for adjusting said temperature responsive means to increase or diminish the quantity of heat supplied to the tunnel, and means for intermittently operating said adjusting means to maintain a predetermined temperature at a point removed from that portion of the tunnel to which the heat is directly supplied.

3. Apparatus for controlling the temperature in a tunnel-type glass annealing leer, comprising a thermostat located close to that point in the tunnel to which heat is directly supplied for controlling the supply of heat thereto, means for varying the setting of said thermostat to increase or diminish the supply of heat to the tunnel as aforesaid, a second thermostat located at a point removed from that point in the tunnel to which heat is directly supplied, means interposed between said second thermostat and said varying means for causing operation of the latter by said second thermostat, and means for causing said last-named means to operate intermittently, said second thermostat operating to maintain a predetermined temperature in the glass being annealed at the point near which it is located irrespective of variations in the heat content of the glass being conducted through said tunnel.

4. Apparatus for controlling the temperature of continuously moving material, such as glass which is enclosed within a heated region, comprising means for supplying heat to the region, temperature responsive means for controlling the supplying of heat to the region in response to the temperature at a point in the heated region, other temperature responsive means for varying the setting of the first-named temperature responsive means, and means for causing the last-named temperature responsive means to operate intermittently in varying the setting of the first named temperature responsive means.

5. Apparatus for controlling the temperature of glass moving slowly and continuously in a predetermined path through a heated region, comprising means for heating the
region, temperature responsive means for
controlling the supply of heat to the region
in response to temperatures therein, means
to adjust said temperature responsive means
to increase or decrease the amount of heat
supplied by the heating means, and automatic means for intermittently operating the
adjusting means to maintain a predetermined temperature in the glass at a point removed from said heating means.

6. Apparatus for controlling the temperature of glass moving slowly and continuously
through a predetermined path in a heated
region, comprising means for supplying heat
to said region, a thermostat located close to
the heating means for controlling the supply
of heat by the latter, means for varying the
setting of said thermostat to increase or diminish the mean supply of heat by said heating means, a second thermostat located at a
point removed from said heating means,
means controlled by said second thermostat
for operating said varying means, and means
for causing the last-named means to operate
intermittently, said last-named thermostat
operating to maintain a predetermined temperature in the glass at a point near which it
is located irrespective of variations in the
heating effect of the glass moving through
said heated region.

7. Apparatus for controlling the temperature of glass moving slowly and continuously through a heated region, comprising
means for heating the region, a thermostat
located adjacent to the heating means and
responsive to the temperature thereof for
controlling the supplying of heat to the
region to keep the temperatures at said thermostat within a certain range setting, a second thermostat located to be responsive to the
temperture of the glass being heated at a
point further along its path of travel than
the said heated region, means operated by the
second thermostat for varying said range
setting, and means for rendering intermittent the correction of the range setting on the
first thermostat by the second thermostat.

8. Apparatus according to claim 7 in
which the intermittent corrections effected by
the second-named thermostat are timed to
occur at intervals each approximately equal
to the time for the effect of an adjusted
range setting of the first thermostat to influence the second named thermostat.

Signed at Hartford, Connecticut, this 4th
day of June, 1929.

HAROLD A. WADMAN.